(12) United States Patent
Mutsuda et al.

(10) Patent No.: US 10,316,181 B2
(45) Date of Patent: Jun. 11, 2019

(54) FIBER-REINFORCED RESIN AND METHOD FOR PRODUCING SAME, AND MOLDED ARTICLE

(71) Applicant: DAICEL-EVONIK LTD., Tokyo (JP)

(72) Inventors: Mitsuteru Mutsuda, Himeji (JP); Thomas Grosse-Puppendahal, Marl (DE)

(73) Assignee: DAICEL-EVONIK LTD., Tokyo (JP)

( * ) Notice: Subject to any disclaimer, the term of this patent is extended or adjusted under 35 U.S.C. 154(b) by 0 days.

(21) Appl. No.: 14/916,842

(22) PCT Filed: Sep. 4, 2014

(86) PCT No.: PCT/JP2014/073320
§ 371 (c)(1),
(2) Date: Mar. 4, 2016

(87) PCT Pub. No.: WO2015/033998
PCT Pub. Date: Mar. 12, 2015

(65) Prior Publication Data
US 2016/0200910 A1      Jul. 14, 2016

(30) Foreign Application Priority Data
Sep. 6, 2013   (JP) ................. 2013-185275

(51) Int. Cl.
| C08L 63/00 | (2006.01) |
| C08K 7/06 | (2006.01) |
| C08L 101/00 | (2006.01) |
| C08J 5/04 | (2006.01) |

(52) U.S. Cl.
CPC ............... *C08L 63/00* (2013.01); *C08J 5/042* (2013.01); *C08K 7/06* (2013.01); *C08L 101/00* (2013.01); *C08J 2363/00* (2013.01); *C08J 2477/00* (2013.01)

(58) Field of Classification Search
CPC .. C08J 5/042; C08K 7/06; C08L 63/00; C08L 101/00
USPC .......................................................... 523/221
See application file for complete search history.

(56) References Cited

U.S. PATENT DOCUMENTS

| 4,863,787 A | 9/1989 | Gawin |
| 6,117,551 A | 9/2000 | Nagata et al. |
| 2013/0281573 A1 | 10/2013 | Goto et al. |
| 2014/0162518 A1 | 6/2014 | Shimizu et al. |

FOREIGN PATENT DOCUMENTS

| EP | 2 878 617 A1 | 6/2015 |
| JP | 63-170427 | 7/1988 |
| JP | 10-231372 A | 9/1998 |
| JP | 2010-59225 A | 3/2010 |
| JP | 2012-211310 A | 11/2012 |
| WO | WO 2012/102201 A1 | 8/2012 |
| WO | WO 2013/015299 A1 | 1/2013 |

OTHER PUBLICATIONS

Toray T800 product data sheet (no date available).*
English translation of Written Opinion of the International Searching Authority dated Sep. 30, 2014, in PCT International Application No. PCT/JP2014/073320.
Mutsuda et al., "Interlaminar Characteristics of CFPR with Thermoplastic Particles Oral Presentation with Slides," The 4th Japan Joint Conference on Composite Materials, Lecture No. 1C-12, Mar. 7, 2013, 53 pages, together with English translation thereof.
Mutsuda et al., "Interlaminar Characteristics of CFRP with Thermoplastic Particles Preprint," The 4th Japan Joint Conference on Composite Materials, Lecture No. 1C-12, Mar. 7, 2013, 15 pages, together with English translation thereof.
International Search Report, issued in PCT/JP2014/073320, dated Sep. 30, 2014.
Written Opinion of the International Searching Authority, issued in PCT/JP2014/073320 (PCT/ISA/237), dated Sep. 30, 2014.
Extended European Search Report for Application No. 14842366.8, dated Mar. 8, 2017.
Notification of Reasons for Refusal issued in corresponding Japanese Application No. JP-2015-535513 dated Apr. 10, 2018, with English language translation.
European Patent Office Communication pursuant to Article 94(3) EPC issued in the corresponding European Patent Application No. 14842366.8 dated Dec. 6, 2017.
Taiwanese Office Action and Search Report,dated Apr. 10, 2018 for Taiwanese Application No. 103130688, along with an English translation.

* cited by examiner

*Primary Examiner* — Edward J Cain
(74) *Attorney, Agent, or Firm* — Birch, Stewart, Kolasch & Birch, LLP

(57) ABSTRACT

In a composition comprising (A) a reinforcing fiber containing a carbon fiber, (B) a resin particle, and (C) a matrix resin (C), the resin particle (B) comprises a spherical resin particle having an average particle diameter of 12 to 70 µm. In a composition comprising (A) a reinforcing fiber containing a carbon fiber, (B) a resin particle, and (C) a matrix resin, the resin particle (B) comprises (B1) a spherical small resin particle having a particle diameter less than an average fiber diameter of the reinforcing fiber (A) and (B2) a spherical large resin particle having a particle diameter not less than the average fiber diameter of the reinforcing fiber (A). The reinforcing fiber (A) may particularly comprise a carbon fiber. The resin particle (B) may particularly comprise a polyamide resin particle. The resin particle (B) may have an average particle diameter of 1 to 10 times as large as the average fiber diameter of the reinforcing fiber (A). In such a composition, the proportion of the resin particle (B) may be not more than 10% by weight (e.g., 1 to 5% by weight) in the total amount of the resin particle (B) and the matrix resin (C). A small amount of the resin particle achieves a sufficient reinforcing function of the reinforcing fiber.

18 Claims, No Drawings

FIBER-REINFORCED RESIN AND METHOD FOR PRODUCING SAME, AND MOLDED ARTICLE

TECHNICAL FIELD

The present invention relates to resin compositions comprising reinforcing fibers, processes for producing the same, and molded articles (or fiber-reinforced composites) comprising the resin compositions.

BACKGROUND ART

Carbon-fiber-reinforced plastics (CFRPs), which comprise carbon fibers and matrix resins, have excellent strength, stiffness, or other characteristics and are used for various applications, for example, primary structure members of flying machines, automotive members, windmill blades, and chassis for various electronic machines. For such applications, particularly important physical properties mainly include physical strength, for example, impact strength, elastic modulus, flexural strength, and interlaminar toughness.

In order to improve such physical properties, it is being devised to add a variety of fillers to a CFRP containing a matrix resin (for example, an epoxy resin component) and a carbon fiber.

A typical example of the fillers includes an inorganic compound particle as represented by a silica. Such a filler itself has a high elastic modulus and is suitable for improving the elastic modulus or flexural strength of the CFRP. However, the filler does not necessarily have a good interfacial affinity with the matrix resin, thus decreasing the impact strength, the interlaminar toughness, or other physical properties.

As a method for improving the impact strength, addition of a rubber-like soft material is also known. Unfortunately, such a soft material reduces the elastic modulus or the flexural strength in contrast to the silica or other inorganic compounds.

Meanwhile, addition of a thermoplastic resin powder as an intermediate material between the inorganic compound and the rubber-like soft material is also being developed.

For example, Japanese Patent Application Laid-Open Publication No. 2012-211310 (JP-2012-211310A, Patent Document 1) discloses a carbon-fiber-reinforced composite comprising a resin layer and a carbon fiber layer on either main side of the resin layer, wherein the resin layer comprises a matrix resin, a resin particle containing a specific alicyclic polyamide resin, and an electroconductive particle having an average particle diameter larger than the resin particle, the carbon fiber layer contains a carbon fiber, and there is a 12-µm or less difference between the average thickness of the resin layer and the average particle diameter of the resin particle.

For the composite described in this document, the difference between the average thickness of the resin layer and the average particle diameter of the resin particle is reduced to 12 µm or less to prevent the interlaminar toughness from decreasing due to variation in the thickness of the resin layer. In order to reduce the difference, it is inevitably necessary to increase the proportion of the resin particle in the resin layer. For example, this document discloses that the proportion of the resin particle in the resin layer is preferably 20 to 70% by volume. In each of working examples, the resin particle is used at a ratio of 15 parts by weight relative to 155 parts by weight of a thermosetting resin composition.

Unfortunately, such a large proportion of the resin particle easily reduces the physical properties of the composite. Moreover, such a large proportion increases a viscosity (thixotropy) of a mixture containing the matrix resin and the resin particle, and thus the mixture is hard to be compounded with the carbon fiber. In some cases, the compounding itself is difficult.

RELATED ART DOCUMENTS

Patent Documents

Patent Document 1: JP-2012-211310A (Claims, [0013], [0121], and Examples)

SUMMARY OF THE INVENTION

Problems to be Solved by the Invention

It is an object of the present invention to provide a resin composition in which a reinforcing effect by a reinforcing fiber (in particular, a carbon fiber) is efficiently improved, a process for producing the resin composition, and a molded article of the resin composition.

Another object of the present invention is to provide a resin composition which effectively shows a reinforcing function of a reinforcing fiber in the presence of a small amount of a resin particle, a process for producing the resin composition, and a molded article of the resin composition.

It is still another object of the present invention to provide a resin composition having an improved interlaminar toughness, and in addition, an improved toughness in an inside of a fiber assembly comprising a reinforcing fiber, a process for producing the resin composition, and a molded article of the resin composition.

Means to Solve the Problems

As described above, in order to obtain a sufficient improvement effect of an interlaminar toughness by the resin particle, it is necessary to reduce the difference between the thickness of the resin layer and the size (average diameter) of the resin particle (further, to relatively increase the proportion of the resin particle in the matrix resin). In the present circumstance, the shape or particle diameter itself of the resin particle is still unexamined for an effect on the reinforcing function of the reinforcing fiber.

Patent Document 1 discloses a variety of methods as a method for producing a resin particle and cites chemical pulverization as a preferred one. Working examples of Patent Document 1 use a resin particle synthesized by chemical pulverization. As described later, the chemical pulverization produces a relatively roundish particle having an uneven surface (what is called an Irish-potato-shaped or potato-shaped particle) and fails to produce a highly spherical particle. Moreover, according to Patent Document 1, although various polyamide resin particles are used, there is no understanding of combination of a specific average particle diameter of the particle and a specific shape thereof at all.

In these circumstances, the inventors of the present invention made intensive studies to achieve the above objects and finally found that selection of a specific resin particle having a specific shape (that is, a spherical shape) and a specific average particle diameter as a resin particle to be added to a composition containing a matrix resin and a reinforcing fiber enables the reinforcing fiber to effectively show a reinforcing function (for example, an improvement effect of interlaminar toughness), and, in particular, achieves a sufficient reinforcing function in the presence of a relatively low proportion of the resin particle. The present invention was accomplished based on the above findings.

That is, an aspect of the present invention provides a composition (a composition for a fiber-reinforced composite) comprising (A) a reinforcing fiber, (B) a resin particle, and (C) a matrix resin; the resin particle (B) comprises a spherical resin particle having an average particle diameter of 12 to 70 μm. The average particle diameter of the resin particle (B) may be about 15 to 60 μm. The average particle diameter of the resin particle (B) may be about 1 to 10 times as large as the average fiber diameter of the reinforcing fiber (A).

Another aspect of the present invention provides a composition comprising (A) a reinforcing fiber, (B) a resin particle, and (C) a matrix resin; the resin particle (B) may comprise (B1) a spherical small resin particle or fine resin particle having a particle diameter less than the average fiber diameter of the reinforcing fiber (A) and (B2) a spherical large resin particle or coarse resin particle having a particle diameter not less than the average fiber diameter of the reinforcing fiber (A). The small resin particle (B1) may comprise (B1a) a small resin particle having a particle size distribution of 1 to 5 μm. The large resin particle (B2) may comprise (B2a) a large resin particle having a particle size distribution of 10 to 30 μm. The weight ratio of the small resin particle (B1a) relative to the large resin particle (B2a) may be about 5/95 to 50/50 in the former/the latter. The total amount of the small resin particle (B1a) and the large resin particle (B2a) may be not less than 50% by weight in the whole resin particle (B). For the composition, the proportion of a resin particle having a particle diameter over 70 μm may be not more than 20% by weight in the whole resin particle (B).

In such a composition, the reinforcing fiber (A) may typically contain a carbon fiber. The resin particle (B) [the small resin particle (B1) and the large resin particle (B2)] may comprise a polyamide resin particle [or the resin constituting the resin particle (B) may comprise a polyamide resin]. In particular, the resin particle (B) [the small resin particle (B1) and the large resin particle (B2)] may comprise an alicyclic polyamide resin particle.

In the composition of the present invention, the proportion of the resin particle (B) may be relatively low, for example, may be not more than 15% by weight in the total amount of the resin particle (B) and the matrix resin (C). The matrix resin (C) may comprise a thermosetting resin component.

In a typical composition, the resin particle (B) may comprise a highly (or truly) spherical polyamide resin particle having an average particle diameter of 20 to 40 μm, the average particle diameter of the resin particle (B) may be 2 to 6 times as large as the average fiber diameter of the reinforcing fiber (A), the proportion of the resin particle (B) may be 1 to 5% by weight in the total amount of the resin particle (B) and the matrix resin (C), the matrix resin (C) may comprise an epoxy resin component. The small resin particle (B1) may comprise a highly (or truly) spherical polyamide resin particle having an average particle diameter of 1 to 5 μm, the large resin particle (B2) may comprise a highly (or truly) spherical polyamide resin particle having an average particle diameter of 10 to 30 μm, the large resin particle (B2) may have an average particle diameter of 2 to 6 times as large as the average fiber diameter of the reinforcing fiber (A), the proportion of the resin particle (B) may be 3 to 15% by weight in the total amount of the resin particle (B) and the matrix resin (C), and the matrix resin (C) may comprise an epoxy resin.

A further aspect of the present invention provides a process for producing the composition; the process comprises impregnating the reinforcing fiber (A) with a mixture comprising the resin particle (B) and the matrix resin (C).

A still further aspect of the present invention provides a molded article (a fiber-reinforced composite, a carbon-fiber-reinforced composite) comprising the composition. In a case where the matrix resin (C) comprises a thermosetting resin component, the molded article may be a cured product of the composition.

In the molded article, the resin particle (B) may richly (or locally) be distributed on or near (or around) the reinforcing fiber (A). In particular, in a case where the resin particle (B) comprises the small resin particle (B1) and the large resin particle (B2) and the reinforcing fiber (A) is in the form of a fiber assembly, the small resin particle (B1) may richly be distributed between fibers inside the fiber assembly and the large resin particle (B2) may richly be distributed on or near (or around) a boundary (or an interface) between the surface of the fiber assembly and the matrix resin. The resin particle (B) contained in such a form enables the reinforcing fiber to efficiently show a reinforcing function.

According to the present invention, use of the resin particle, in particular, a resin particle having a specific shape and a specific particle diameter [that is, the resin particle (B)] can increase or improve the reinforcing function of the reinforcing fiber. In other words, such a specific resin particle functions as an additive for increasing or improving the reinforcing function of the reinforcing fiber.

Thus, an aspect of the present invention provides an additive which is added to a composition comprising (A) a reinforcing fiber [in particular, (A) a reinforcing fiber containing a carbon fiber] and (C) a matrix resin in order to increase or improve (or promote) the reinforcing effect (strength-increasing effect) by the reinforcing fiber (A); the additive comprises (B) a spherical resin particle having an average particle diameter of 12 to 70 μm. Another aspect of the present invention provides an additive which is added to a composition comprising (A) a reinforcing fiber containing a carbon fiber and (C) a matrix resin in order to increase or improve the reinforcing effect by the reinforcing fiber (A); the additive comprises (B1) a spherical small resin particle having a particle diameter less than the average fiber diameter of the reinforcing fiber (A) and (B2) a spherical large resin particle having a particle diameter not less than the average fiber diameter of the reinforcing fiber (A).

Effects of the Invention

According to the present invention, use of a specific resin particle having a specific shape and a specific particle diameter efficiently achieves a reinforcing effect (for example, an improvement effect of interlaminar toughness) by a reinforcing fiber (in particular, a carbon fiber).

In particular, according to the present invention, the reinforcing fiber effectively displays the reinforcing function in the presence of a small amount to be added of the resin particle. In other words, a sufficient reinforcing function is achieved in the presence of a small amount of the resin particle. Moreover, reducing the amount to be added of the resin particle easily decreases the viscosity of the composition (or mixture) containing the matrix resin and the resin particle and easily improves the handleability of the composition. Further, the reduction of the amount to be added of the resin particle makes a boundary between different materials smaller, thus efficiently preventing reduction of physical properties (for example, resistance to repeated fatigue and long-term creep).

Furthermore, due to a reduced proportion of the resin particle itself, the molded article (fiber-reinforced composite) easily maintains characteristics or physical properties derived from the matrix resin (and the reinforcing fiber). Thus, according to the present invention, the reinforcing fiber displays a sufficient reinforcing effect while characteristics derived from the matrix resin (and the reinforcing fiber) are unspoiled.

Moreover, in some cases the present invention unexpectedly further improves the reinforcing effect itself by the reinforcing fiber compared with a common resin particle. Such an improvement of the reinforcing effect, which is achieved in a case where the amount of the resin particle is smaller, is extremely useful.

The reason why the reinforcing fiber effectively displays the reinforcing function is not known exactly, but a possible reason is that the resin particle unexpectedly tends to be richly or locally distributed on or near (or around) the reinforcing fiber in the matrix resin. Specifically, the effect improving interlaminar toughness or other characteristics may be produced by the resin particle dispersed in the matrix resin, mainly the resin particle existing on or near the reinforcing fiber. Thus, rich (or local) distribution of the resin particle on or near (or around) the reinforcing fiber makes it possible for the reinforcing fiber to display a sufficient reinforcing function in the presence of a small amount to be added of the resin particle.

Further, in a case where the small resin particle (B1) and the large resin particle (B2) are used in combination and the reinforcing fiber is in the form of a fiber assembly, not only the interlaminar toughness but also the toughness at the inside of the fiber assembly are improvable, probably because the small resin particle (B1) is richly distributed between fibers inside the fiber assembly and the large resin particle (B2) is richly distributed on or near a boundary (or a boundary area) between the surface of the fiber assembly and the matrix resin.

DESCRIPTION OF EMBODIMENTS

[Composition]
The composition of the present invention comprises a reinforcing fiber (which may be referred to as (A) a reinforcing fiber), a resin particle (which may be referred to as (B) a resin particle), and a matrix resin (matrix-forming resin) component (which may be referred to as (C) a matrix resin). The present invention is characterized in that a resin particle at least containing a specific resin particle is used as the resin particle.

Such a composition, which can be used as a composition for obtaining a fiber-reinforced composite (or a fiber-reinforced resin) as described later, may also be referred to as a composition for a fiber-reinforced composite (or a composition for a fiber-reinforced resin).

Hereinafter, each component will be explained in detail.
(Reinforcing Fiber)
The reinforcing fiber (strengthening fiber, fibrous reinforcing material, fibrous filler, fibrous filling material) can be used as a component that reinforces (or strengthens) a matrix resin.

The reinforcing fiber may comprise a non-carbon fiber. The reinforcing fiber usually contains a carbon fiber.

The carbon fiber may include, but should not be limited to, a pitch-based fiber, a polyacrylonitrile (PAN)-based carbon fiber, or other fibers.

The non-carbon fiber may include an inorganic fiber (for example, a glass fiber, a boron fiber, an aluminosilicate fiber, an aluminum oxide fiber, a silicon carbide fiber, a metal fiber, and a potassium titanate fiber), an organic fiber {for example, a polyester fiber [e.g., an aromatic polyester fiber (e.g., a poly(alkylene arylate) fiber such as a polyethylene terephthalate) fiber)], a polyamide fiber [e.g., an aromatic polyamide fiber (e.g., an aramid fiber)], and a regenerated fiber (e.g., a rayon)}.

The reinforcing fibers may be used alone or in combination.

For a combination of the carbon fiber and the non-carbon fiber (for example, a glass fiber, an organic fiber), the proportion of the carbon fiber in the whole reinforcing fiber may be, for example, not less than 30% by volume, preferably not less than 50% by volume, and more preferably not less than 70% by volume (in particular, not less than 90% by volume).

The reinforcing fiber may be surface-treated.

The reinforcing fiber may have an average diameter selected, depending on the species thereof, from a range of about 0.5 to 1000 µm (e.g., about 1 to 500 µm). For example, the reinforcing fiber may have an average diameter of about 1 to 300 µm (e.g., about 2 to 100 µm), preferably about 3 to 70 µm, more preferably about 5 to 50 µm (e.g., about 5 to 30 µm).

In particular, the carbon fiber (or the reinforcing fiber containing the carbon fiber) may have an average diameter (average fiber diameter) of, for example, about 1 to 100 µm (e.g., about 1.5 to 70 µm), preferably about 2 to 50 µm (e.g., about 2.5 to 40 µm), more preferably about 3 to 30 µm, particularly about 5 to 20 µm (e.g., about 6 to 15 µm), and usually about 5 to 15 µm (e.g., about 7 to 10 µm).

In the present invention, the fiber diameter can be measured by a common method. For example, the fiber diameter can be determined by measuring fiber diameters of 10 or more fibers with an electron microscope and calculating the average of the measured values.

The reinforcing fiber may be either a short fiber or a long fiber. In particular, the reinforcing fiber may be a long fiber. The long fiber may be either a continuous fiber or a discontinuous fiber or may be combination of a continuous fiber and a discontinuous fiber.

The reinforcing fiber may be used to form a fabric (or a cloth or a textile). The fabric (fiber assembly) may include, for example, a woven fabric (a woven product), a nonwoven fabric, and a knit fabric (a knit product). The reinforcing fibers may be contained in the composition, which comprises the resin particle and the matrix resin, in an embodiment that the reinforcing fibers are arranged in the same direction (or one direction) as described later.

The structure of the cloth can suitably be selected according to the species of the cloth. For example, the structure of the woven fabric (woven construction) may include, but should not be limited to, a plain weave, a twill weave, a satin weave, or other structures. The structure of the knit fabric (knit construction) may include a warp knit (for example, a tricot), a weft knit (for example, a plain stitch and a Tuck stitch), or other structures.

(Resin Particle)
The resin constituting the resin particle (resin particle (B)) may be either a thermoplastic resin or a thermosetting resin. The resin may usually be a thermoplastic resin.

The thermoplastic resin is not limited to a particular resin and is any resin that can improve (or assist) the reinforcing effect by the reinforcing fiber. For example, the thermoplastic resin may include a polyamide resin, a polyester resin [for example, an aromatic polyester resin such as a poly (ethylene terephthalate)], a polyacetal resin, a polycarbonate resin, a poly(phenylene ether) resin, a polysulfide resin, a polysulfone resin, a polyetherketone resin, a polyimide resin, a polyolefin resin, a polystyrene resin, and an acrylic resin. The thermoplastic resins may be used alone or in combination.

Among them, the polyamide resin is particularly preferred. Thus, the resin may comprise at least the polyamide resin. In particular, combination of the resin particle comprising the polyamide resin with an epoxy resin as the matrix resin tends to effectively improve the reinforcing effect.

The polyamide resin is not limited to a particular one. For example, the polyamide resin may include an aliphatic polyamide resin, an alicyclic polyamide resin, and an aromatic polyamide resin. The polyamide resin may be a homopolyamide or a copolyamide.

Among the aliphatic polyamide resins, the homopolyamide may include a homo- or co-polyamide of an aliphatic diamine component and an aliphatic dicarboxylic acid component, a homo- or co-polyamide of a lactam or an aminocarboxylic acid, and a copolyamide of an aliphatic diamine component, an aliphatic dicarboxylic acid component, and a lactam or an aminocarboxylic acid. Examples of the aliphatic diamine component may include an alkanediamine, for example, a $C_{4-16}$alkylenediamine such as tetramethylenediamine, hexamethylenediamine, or dodecanediamine, preferably a $C_{6-14}$alkylenediamine, and more preferably a $C_{6-12}$alkylenediamine. Examples of the aliphatic dicarboxylic acid component may include an alkanedicarboxylic acid, for example, a $C_{4-20}$alkanedicarboxylic acid such as adipic acid, sebacic acid, or dodecanedioic acid, preferably a $C_{5-18}$alkanedicarboxylic acid, and more preferably a $C_{6-16}$alkanedicarboxylic acid. Examples of the lactam may include, for example, a lactam having about 4 to 20 (preferably about 4 to 16) carbon atoms, such as ε-caprolactam or ω-laurolactam. Examples of the aminocarboxylic acid may include, for example, a $C_{4-20}$ aminocarboxylic acid such as ω-aminoundecanoic acid, preferably a $C_{4-16}$aminocarboxylic acid, and more preferably a $C_{6-14}$aminocarboxylic acid.

Concrete examples of the aliphatic polyamide resin may include a polyamide 46, a polyamide 66, a polyamide 610, a polyamide 612, a polyamide 613, a polyamide 1010, a polyamide 1012, a polyamide 6, a polyamide 11, a polyamide 12, a polyamide 611, a polyamide 612, a polyamide 66/11, a polyamide 66/12, a polyamide 6/12/612, or others.

The alicyclic polyamide resin may include, for example, a homopolyamide or copolyamide comprising as a constituent at least one member selected from the group consisting of an alicyclic diamine component and an alicyclic dicarboxylic acid component. For example, as the alicyclic polyamide resin, there may be used an alicyclic polyamide which at least contains an alicyclic diamine and/or an alicyclic dicarboxylic acid as at least one of diamine components and dicarboxylic acid components. In particular, as the diamine component and the dicarboxylic acid component, combination use of the above-exemplified aliphatic diamine component and/or aliphatic dicarboxylic acid component with the alicyclic diamine component and/or alicyclic dicarboxylic acid component is preferred. Such an alicyclic polyamide resin, which has a high transparency, is known as what is called a transparent polyamide.

The alicyclic diamine component may include a diaminocycloalkane such as diaminocyclohexane (e.g., a diamino$C_{5-10}$cycloalkane); and a bis(aminocycloalkyl)alkane such as bis(4-aminocyclohexyl)methane, bis(4-amino-3-methylcyclohexyl)methane, or 2,2-bis(4'-aminocyclohexyl)propane [e.g., a bis(amino$C_{5-8}$cycloalkyl)$C_{1-3}$alkane]; a hydrogenated xylylenediamine; or other components. The alicyclic diamine component may have a substituent such as an alkyl group (a $C_{1-6}$alkyl group such as methyl group or ethyl group, preferably a $C_{1-4}$alkyl group, and more preferably a $C_{1-2}$alkyl group). The alicyclic dicarboxylic acid may include a cycloalkanedicarboxylic acid such as 1,4-cyclohexanedicarboxylic acid or 1,3-cyclohexanedicarboxylic acid (e.g., $C_{5-10}$cycloalkane-dicarboxylic acid), or other compounds.

Representative examples of the alicyclic polyamide resin may include a condensation product of an alicyclic diamine component [e.g., a bis(aminocyclohexyl)alkane] and an aliphatic dicarboxylic acid component [e.g., an alkanedicarboxylic acid (e.g., a $C_{4-20}$alkanedicarboxylic acid component)].

The aromatic polyamide resin may include a polyamide in which at least one of an aliphatic diamine component and an aliphatic dicarboxylic acid component in an aliphatic polyamide resin is an aromatic component, for example, a polyamide in which a diamine component is an aromatic diamine component [for example, a condensation product (e.g., MXD-6) of an aromatic diamine (e.g., m-xylylenediamine) and an aliphatic dicarboxylic acid], and a polyamide in which a dicarboxylic acid component is an aromatic component [for example, a condensation product of an aliphatic diamine (e.g., trimethylhexamethylenediamine) and an aromatic dicarboxylic acid (such as terephthalic acid or isophthalic acid)]. The aromatic polyamide resin may be a fully aromatic polyamide (aramid) in which a diamine component and a dicarboxylic acid component are aromatic components [e.g., a poly(m-phenyleneisophthalamide)].

The polyamide resins may be used alone or in combination.

According to the present invention, a resin particle comprising a widely used polyamide resin which is not limited to a specific alicyclic polyamide resin as described in Patent Document 1 can effectively increase the reinforcing function of the strengthening fiber. Among others, in the respect that the resin particle (B) is easy to richly distribute on or near the reinforcing fiber (A), the alicyclic polyamide resin is preferred. In particular, a highly spherical alicyclic polyamide resin produced by using phase separation phenomenon or other means is particularly preferred.

The polyamide resin may have a number average molecular weight of, for example, about 8000 to 200000, preferably about 9000 to 150000, and more preferably about 10000 to 100000. The number average molecular weight can be measured by gel permeation chromatography using a polystyrene or other substances as a standard substance, or other means.

In a case where the polyamide resin has a melting point, the melting point is not limited to a particular temperature. A polyamide resin having a relatively high melting point may preferably be used. Such a polyamide resin tends to maintain a spherical shape thereof at a high level in producing a composition or a molded article, and this probably contributes to efficiently obtaining the reinforcing effect by the reinforcing fiber. Such a polyamide resin (such as an aliphatic polyamide resin or an alicyclic polyamide resin) may have a melting point of, for example, not lower than 150° C. (e.g., about 155 to 350° C.), preferably not lower than 160° C. (e.g., about 165 to 300° C.), and more preferably not lower than 170° C. (e.g., about 175 to 270° C.). The polyamide resin may have a melting point (or softening point) not lower than (or higher than) a molding temperature of the composition [for example, a curing temperature of a curable resin (e.g., an epoxy resin) as the matrix resin].

Although the aromatic polyamide resin may have no melting point (or may be amorphous), the aromatic polyamide resin, which has a high melting temperature and easily maintains a spherical shape thereof, can preferably be used together with a polyamide resin having a melting point within the range as described above.

The resin particle (B) has a spherical shape. The spherical shape may include a highly spherical shape and a substantially spherical shape [for example, a shape having a smooth surface (or having no uneven structure on a surface thereof) and having a major axis slightly longer than a minor axis (for example, a ratio of major axis/minor axis of about 1.3/1 to 1/1, preferably about 1.2/1 to 1/1, and more preferably about 1.1/1 to 1/1)]. In particular, the highly spherical shape is preferred.

As the shape of the resin particle, an amorphous shape, a potato shape, a spherical shape, or other shapes are known. Such a shape is practically determined according to a method for producing the particle.

Representative examples of the method for producing the particle may include (1) a cryogenic pulverization (for example, a method that comprises cooling and embrittling a resin with liquid nitrogen or other means and then pulverizing or crushing the resin by a physical force to give a particle (or a powder)), (2) a chemical pulverization (for example, a method that comprises dissolving a resin in a solvent and then adding the resulting solution to a poor solvent for precipitation), (3) a polymerization (for example, a method that comprises polymerizing a raw material by suspension polymerization or emulsion polymerization to give a particle), (4) a forced emulsification {for example, a method that comprises melt-kneading a resin and a material incompatible with the resin [e.g., a water-soluble material, such as a water-soluble polymer (such as a poly(ethylene glycol)) or a saccharide (such as a polysaccharide or an oligosaccharide)] to give a dispersion containing a resin particle dispersed in the incompatible material (water-soluble polymer) and then removing the incompatible material from the dispersion}, and (5) a laser method (a method that comprises instantaneously melting a fibrous resin by laser and flying the resin in a decompression bath or others to give a resin particle).

Among these methods, the method using an interfacial tension [for example, the polymerization (3), the forced emulsification (4), and the laser method (5)] produces a spherical particle. Thus, the resin particle (B) may particularly be a resin particle produced by the method using an interfacial tension [for example, the polymerization (3), the forced emulsification (4), and the laser method (5)].

Incidentally, the cryogenic pulverization (1), which forms a fractured section by crushing, fails to produce a spherical particle. The chemical pulverization (2), which is a preferred method in Patent Document 1, forms no fractured section differently from the cryogenic pulverization and produces a particle having a relatively rounded surface. However, the particle produced by the chemical pulverization has an uneven structure on a surface thereof (what is called an Irish potato shape or a potato shape), and thus the chemical pulverization also fails to produce a spherical particle.

As the highly spherical resin particle, a highly spherical resin particle having a smooth surface is particularly preferred. For example, for a highly spherical particle having an average particle diameter of 21 μm and a smooth surface, the particle has a BET specific surface area of about 0.2 to 0.4 $m^2/g$. In contrast, for a potato-shaped particle having a low surface smoothness, the particle has a BET specific surface area of about 1.5 to 3 $m^2/g$. A preferred BET specific surface area can be selected according to a particle diameter, and is, for example, about 0.05 to 2 $m^2/g$ and preferably about 0.1 to 1 $m^2/g$.

The resin particle (B) may have an average particle diameter (average particle size) from a range of not less than 12 μm (for example, 13 to 85 μm). For example, the average particle diameter may be not less than 14 μm (e.g., about 15 to 80 μm), preferably not less than 16 μm (e.g., about 17 to 75 μm), more preferably not less than 18 μm (e.g., about 19 to 70 μm), and particularly not less than 20 μm (e.g., about 21 to 60 μm) or may usually be about 12 to 70 μm (e.g., about 15 to 60 μm, preferably about 18 to 50 μm, more preferably about 20 to 45 μm, particularly about 20 to 40 μm, and particularly preferably about 20 to 30 μm). In the present invention, the average particle diameter is expressed as a number average primary particle diameter and can be measured by laser diffraction scattering method or other means in accordance with Japanese Industrial Standards (JIS) R9301-2-2.

The above range is a range of the average particle diameter, although, probably, a resin particle having a particle diameter within the above range mainly contributes to an efficient reinforcing effect. Accordingly, the resin particle (B) may comprise a resin particle having a particle diameter of the particle diameter range (for example, a resin particle having a particle diameter of 15 to 60 μm) at a proportion of not less than 50% (e.g., not less than 60%), preferably not less than 70%, more preferably not less than 80%, and particularly not less than 90% in the whole resin particle (B).

The average particle diameter of the resin particle (B) can also be selected according to the average diameter of the reinforcing fiber (A). For example, the average particle diameter of the resin particle (B) may be about 0.5 to 15 times (e.g., about 0.7 to 12 times), preferably about 1 to 10 times (e.g., about 1.5 to 8 times), and more preferably about 1.8 to 7 times (e.g., about 2 to 6 times) as large as the average diameter (average fiber diameter) of the reinforcing fiber (A) or may usually be about 1.5 to 15 times (e.g., about 2 to 10 times) as large as the average diameter (average fiber diameter) of the reinforcing fiber (A). A resin particle having such a particle diameter tends to be richly distributed on or near (or around) the reinforcing fiber, easily achieving an efficiently increased reinforcing effect by the reinforcing fiber.

According to the present invention, in particularly, it is preferred that the resin particle (B) contain (B1) a spherical small resin particle (or a resin particle with a smaller diameter) having a particle diameter less than the average fiber diameter of the reinforcing fiber (A) and (B2) a spherical large resin particle (or a resin particle with a larger diameter) having a particle diameter not less than the average fiber diameter of the reinforcing fiber (A).

The particle size distribution (grain size or particle diameter range) of the small resin particle (B1) is in any range that is narrower than the average fiber diameter of the reinforcing fiber (A), and can be selected from a particle diameter range of about D-5 to D-1 μm where D (μm) is the average fiber diameter of the reinforcing fiber (A). The particle size distribution can specifically be selected according to the fiber diameter of the reinforcing fiber and may be, for example, not more than 5 μm (e.g., about 1 to 5 μm), preferably about 2 to 4 µm, and more preferably about 1 to 3 µm. According to the present invention, it is particularly preferred that the small resin particle (B1) contain (B1a) a small resin particle having a particle size distribution of 1 to 5 µm. According to the present invention, the particle size distribution can also be measured by laser diffraction scattering method or other means.

The average particle diameter of the small resin particle (B1) can also be selected from the same range as that of the particle size distribution and may be, for example, not more than 5 µm, preferably about 1 to 5 µm (e.g., about 2 to 4 µm), and more preferably about 1 to 3 µm. The average particle diameter of the small resin particle (B1) may be about 0.05 to 0.9 times, preferably about 0.1 to 0.8 times, and more preferably about 0.15 to 0.6 times (in particular, about 0.2 to 0.5 times) as large as the average fiber diameter of the reinforcing fiber (A). A small resin particle having too large an average particle diameter may fail to enter an inter-fiber space, and the reinforcing effect by the reinforcing fiber may be reduced. A small resin particle having too small an average particle diameter may be difficult to distribute uniformly due to easy aggregation, and the reinforcing effect by the reinforcing fiber may be reduced.

The particle size distribution (grain size or particle diameter range) of the large resin particle (B2) is in any range that is not narrower than the average fiber diameter of the reinforcing fiber (A), and can be selected from a particle diameter range of about D to D+30 µm (in particular, about D+1 to D+20 µm) where D (µm) is the average fiber diameter of the reinforcing fiber (A). The particle size distribution can specifically be selected according to the fiber diameter of the reinforcing fiber and may be, for example, not less than 10 µm (e.g., about 10 to 70 µm), preferably about 10 to 50 µm (e.g., about 12 to 40 µm), and more preferably about 10 to 30 µm (particularly about 12 to 25 µm). According to the present invention, it is particularly preferred that the large resin particle (B2) contain (B2a) a large resin particle having a particle size distribution of 10 to 30 µm.

The average particle diameter of the large resin particle (B2) can also be selected from the same range as that of the particle size distribution and may be, for example, not less than 10 µm (e.g., about 10 to 70 µm), preferably about 10 to 50 µm (e.g., about 12 to 40 µm), and more preferably about 10 to 30 µm (particularly about 12 to 25 µm). The average particle diameter of the large resin particle (B2) may be about 1 to 10 times, preferably about 1.5 to 8 times, and more preferably about 2 to 6 times (in particular, about 2.5 to 5 times) as large as the average fiber diameter of the reinforcing fiber (A). A large resin particle having too large an average particle diameter may be difficult to richly distribute on or near the reinforcing fiber (in a case where the reinforcing fiber is used to form a fabric, on or near a boundary between the surface of the fabric and the matrix resin). A large resin particle having too small an average particle diameter may be difficult to richly distribute on or near the reinforcing fiber.

The weight ratio of the small resin particle (B1a) relative to the large resin particle (B2a) [the former/the latter] may be, for example, about 5/95 to 50/50, preferably about 10/90 to 40/60, and more preferably about 15/85 to 30/70 (in particular, about 20/80 to 25/75). For a fabric made with the reinforcing fiber, too low a proportion of the small resin particle (B1a) may contribute to easy formation of a crack between fibers in the fabric. In contrast, too high a proportion of the small resin particle (B1a) may contribute to easy interfacial separation (or formation of a crack) between the fabric and the matrix resin.

The total amount of the small resin particle (B1a) and the large resin particle (B2a) may be not less than 50% by weight in the whole resin particle (B) or, for example, is about 50 to 100% by weight, preferably about 60 to 95% by weight, and more preferably about 70 to 90% by weight (particularly about 75 to 85% by weight) in the whole resin particle (B). Too small a total amount of both particles may contribute to a reduced reinforcing effect by the reinforcing fiber.

In order to easily distribute the resin particle (B) richly on or near the reinforcing fiber, it is preferred that the proportion of a resin particle having a particle diameter over 70 µm in the whole resin particle (B) be low. The proportion of the resin particle having a particle diameter over 70 µm in the whole resin particle (B) may be not more than 20% by weight or may be preferably not more than 10% by weight and more preferably not more than 5% by weight. A higher proportion of a resin particle having such a large particle diameter reduces a proportion of a resin particle distributed on or near the reinforcing fiber, and the reinforcing effect by the reinforcing fiber may be reduced.

(Matrix Resin)

The matrix resin is a resin component that is a matrix of a composition containing the strengthening fiber (A) (and the resin particle (B)), and can suitably be selected according to purposes or desired characteristics.

Such a matrix resin may comprise at least a resin (a resin component). The resin, which can be selected according to purposes or desired characteristics or physical properties, may a thermoplastic resin [for example, an acrylic resin, a polyolefin resin (e.g., a polypropylene), a polyamide resin (e.g., the above-exemplified polyamide resin), a polyester resin (e.g., an aromatic polyester resin such as a poly(ethylene terephthalate)), a polycarbonate resin, a poly(phenylene ether) resin, a poly(phenylene sulfide) resin, a polysulfone resin, a polyetherketone resin, polyetheretherketone resin, a polyimide resin, and a polyetherimide resin] or a thermosetting resin (a thermosetting or light-curable resin). The resins may be used alone or in combination.

In particular, according to the present invention, the thermosetting resin can preferably be used, from the point of view of strength or thermal characteristics, in combination with the resin particle (B). Thus, the resin may comprise at least a thermosetting resin.

The thermosetting resin may include, for example, an epoxy resin, an unsaturated polyester resin, a vinyl ester resin, an acrylic resin, a phenolic resin, a urea resin, a melamine resin, an aniline resin, a polyimide resin, and a bismaleimide resin. The thermosetting resins may be used alone or in combination.

Among these thermosetting resins, in particular, the epoxy resin is preferred. The epoxy resin may include, for example, a glycidyl ether-based epoxy resin, a glycidylamine-based epoxy resin (e.g., tetraglycidyldiaminodiphenylmethane, triglycidyl-p-aminophenol, triglycidylaminocresol, diglycidylaniline, and N,N-diglycidyl-4-glycidyloxyaniline), a glycidyl ester-based epoxy resin [for example, a diglycidyl ester of a dicarboxylic acid (e.g., an aromatic dicarboxylic acid or a hydrogenated product thereof, such as terephthalic acid, isophthalic acid, phthalic acid, tetrahydrophthalic acid, or hexahydrophthalic acid)], an alkene oxide (e.g., vinylcyclohexene dioxide), and triglycidyl isocyanurate.

The glycidyl ether-based epoxy resin may include, for example, an epoxy resin (polyglycidyl ether) having an aromatic skeleton and an epoxy resin (polyglycidyl ether) having an aliphatic skeleton. Examples of the epoxy resin having an aromatic skeleton may include a bisphenol-based epoxy resin [a reaction product of a bisphenol or an alkylene oxide adduct thereof and epichlorohydrin (such as a bisphenol A-based epoxy resin, a bisphenol F-based epoxy resin, a bisphenol S-based epoxy resin, or a brominated bisphenol-based epoxy resin)], a phenol-based epoxy resin (e.g., a phenol novolac epoxy resin, a cresol novolac epoxy resin, a naphthol novolac epoxy resin, a bisphenol A novolac epoxy resin, a bisphenol F novolac epoxy resin, a biphenyl skeleton-containing phenol novolac resin, and a xylylene skeleton-containing phenol novolac resin), a dicyclopentadiene-based epoxy resin, and a glycidyl ether having a naphthalene skeleton [for example, a di(glycidyloxy)naphthalene such as 1,5-di(glycidyloxy)naphthalene, and bis[2,7-di(glycidyloxy)naphthyl]methane]. Examples of the epoxy resin having an aliphatic skeleton may include an alkanediol glycidyl ether (e.g., a $C_{2-10}$alkanediol diglycidyl ether such as butanediol diglycidyl ether, neopentyl glycol diglycidyl ether, or 1,6-hexanediol diglycidyl ether), a polyalkanediol diglycidyl ether (e.g., a poly$C_{2-4}$alkanediol diglycidyl ether such as polypropylene glycol diglycidyl ether), and a di- to hexa-glycidyl ether of an alkanetri- to hexa-ol (e.g., a di- or tri-glycidyl ether of a $C_{3-10}$alkanetri- or tetra-ol, such as trimethylolpropane di- or tri-glycidyl ether, or glycerin di- or tri-glycidyl ether).

For the alkylene oxide adduct of the bisphenol, the mole number of alkylene oxides added to 1 mol of hydroxyl groups of the bisphenol may be, for example, not less than 1 mol (e.g., about 1 to 20 mol), preferably about 1 to 15 mol, and more preferably about 1 to 10 mol.

The epoxy resins may be used alone or in combination.

Among these epoxy resins, the epoxy resin having an aromatic skeleton, for example, a bisphenol-based epoxy resin, is preferred in light of strength or other characteristics. Thus, the epoxy resin may comprise at least an epoxy resin having an aromatic skeleton or may comprise an epoxy resin having an aromatic skeleton and another epoxy resin (for example, an epoxy resin having an aliphatic skeleton) in combination.

The epoxy resin may further comprise a monofunctional epoxy compound (or a diluent) [for example, a monoglycidyl ether [e.g., an alkyl glycidyl ether (e.g., 2-ethylhexyl glycidyl ether), an alkenyl glycidyl ether (e.g., allyl glycidyl ether), an aryl glycidyl ether (e.g., phenyl glycidyl ether)], and an alkene oxide (such as octylene oxide or styrene oxide)]. For combination of the epoxy resin and the monofunctional epoxy compound, the ratio of the epoxy resin relative to the monofunctional epoxy compound [the former/the latter (weight ratio)] may be, for example, about 99/1 to 50/50, preferably about 97/3 to 60/40, and more preferably about 95/5 to 70/30.

The epoxy resin (or a composition containing the epoxy resin and the monofunctional epoxy compound) may be solid or liquid at a room temperature (e.g., about 20 to 30° C.). The liquid epoxy resin may have a viscosity (at 25° C.) of, for example, about 50 to 50000 mPa·s, preferably about 100 to 40000 mPa·s (e.g., about 200 to 35000 mPa·s), and more preferably about 300 to 30000 mPa·s (e.g., about 500 to 25000 mPa·s) or may have a viscosity (at 25° C.) of not lower than 1000 mPa·s (e.g., about 2000 to 50000 mPa·s, preferably about 3000 to 30000 mPa·s, and more preferably about 5000 to 25000 mPa·s).

In a case where the matrix resin comprises a thermosetting resin, the matrix resin may further contain a curing agent or a curing accelerator. Specifically, the matrix resin may comprise a resin (a thermosetting resin) and a curing agent or a curing accelerator for the resin.

The curing agent can suitably be selected according to the species of the resin. For example, in a case where the resin is an epoxy resin, the curing agent may include, for example, an amine-based curing agent, a phenolic resin-based curing agent (e.g., a phenol novolac resin and a cresol novolac resin), an acid anhydride-based curing agent [e.g., an aliphatic dicarboxylic anhydride (such as dodecenylsuccinic anhydride), an alicyclic dicarboxylic anhydride (such as tetrahydrophthalic anhydride, methyltetrahydrophthalic anhydride, or hexahydrophthalic anhydride), and an aromatic dicarboxylic anhydride (such as phthalic anhydride, trimellitic anhydride, pyromellitic anhydride, or benzophenonetetracarboxylic anhydride)], a polymercaptan-based curing agent, and a latent curing agent (such as boron trifluoride-amine complex, dicyandiamide, or a carbohydrazide).

The amine-based curing agent may include, for example, an aromatic amine-based curing agent, an aliphatic amine-based curing agent, an alicyclic amine-based curing agent, and an imidazole compound or a salt thereof (e.g., a formate, a phenol salt, a phenol novolac salt, and a carbonate). Examples of the aromatic amine-based curing agent may include a polyaminoarene (e.g., a diaminoarene such as p-phenylenediamine or m-phenylenediamine), a polyaminoalkylarene (e.g., a diamino-alkylarene such as diethyltoluenediamine), a poly(aminoalkyl)arene [e.g., a di(aminoalkyl)arene such as xylylenediamine], a poly(aminoaryl)alkane [e.g., a di(aminoaryl)alkane such as diaminodiphenylmethane], a poly(amino-alkylaryl)alkane [e.g., a di(amino-alkylaryl)alkane such as 4,4'-methylenebis(2-ethyl-6-methylaniline)], a bis(aminoarylalkyl)arene {e.g., 1,3-bis[2-(4-aminophenyl)-2-propyl]benzene and 1,4-bis[2-(4-aminophenyl)-2-propyl]benzene}, a di(aminoaryl) ether (e.g., diaminodiphenyl ether), a di(aminoaryloxy)arene [e.g., 1,3-bis(3-aminophenoxy)benzene], and a di(aminoaryl) sulfone (e.g., diaminodiphenylsulfone). Examples of the aliphatic amine-based curing agent may include ethylenediamine, hexamethylenediamine, diethylenetriamine, triethylenetetramine, tetraethylenepentamine, and diethylaminopropylamine. Examples of the alicyclic amine-based curing agent may include menthenediamine, isophoronediamine, bis(4-amino-3-methylcyclohexyl)methane, 3,9-bis(3-aminopropyl)-2,4,8,10-tetraoxaspiro[5.5] undecane, and norbornanediamine. Examples of the imidazole compound may include an alkylimidazole such as 2-methylimidazole, 2-phenylimidazole, 2-heptadecylimidazole, or 2-ethyl-4-methylimidazole; and an arylimidazole such as 2-phenylimidazole, 2-phenyl-4-methylimidazole, 2-phenyl-4-methyl-5-hydroxymethylimidazole, or 1-benzyl-2-phenylimidazole.

The curing agents may be used alone or in combination. The curing agent can also act as a curing accelerator.

Among them, in particular, the amine-based curing agent (for example, an aromatic amine-based curing agent) may preferably be used.

The ratio of the curing agent can suitably be selected according to the species of the epoxy resin (e.g., epoxy equivalent), the species of the curing agent, or others. For example, the ratio of the curing agent relative to 100 parts by weight of the epoxy resin may be about 0.1 to 300 parts by weight, preferably about 1 to 250 parts by weight, more preferably about 3 to 200 parts by weight (e.g., about 4 to 150 parts by weight), and particularly about 5 to 100 parts by weight.

The curing accelerator can also be selected according to the species of the resin. For example, in a case where the resin comprises an epoxy resin, the curing accelerator may include, for example, a phosphine compound (e.g., ethylphosphine, propylphosphine, trialkylphosphine, phenylphosphine, and triphenylphosphine) and an amine compound (e.g., a secondary to tertiary amine such as triethylamine, piperidine, benzyldimethylamine, triethanolamine, dimethylaminoethanol, triethylenediamine, tris(dimethylaminomethyl)phenol or N,N-dimethylpiperazine, or a salt thereof). The curing accelerators may be used alone or in combination.

The ratio of the curing accelerator can suitably be selected according to the species of the curing agent, or others. For example, the ratio of the curing accelerator relative to 100 parts by weight of the epoxy resin may be about 0.01 to 100 parts by weight, preferably about 0.05 to 50 parts by weight, and more preferably about 1 to 30 parts by weight.

In the composition (or the molded article described later) of the present invention, the proportion of the resin particle (B) in the total amount of the resin particle (B) and the matrix resin (C) (when the matrix resin contains a curing agent and/or a curing accelerator, the amount of the matrix resin (C) means the total amount of the resin and the curing agent and/or the curing accelerator) can be selected from a range of not more than 50% by weight (e.g., about 0.1 to 40% by weight) or may, for example, be not more than 30% by weight (e.g., about 0.5 to 25% by weight), preferably not more than 20% by weight (e.g., about 1 to 18% by weight), and more preferably not more than 15% by weight (e.g., about 2 to 12% by weight) or may be not more than 10% by weight (e.g., about 0.5 to 8% by weight, and preferably about 1 to 5% by weight).

In particular, in a case where the resin particle (B) comprises the small resin particle (B1) and the large resin particle (B2), the proportion of the resin particle (B) in the total amount of the resin particle (B) and the matrix resin (C) may be not more than 20% by weight (e.g., about 1 to 20% by weight), preferably not more than 17% by weight (e.g., about 2 to 17% by weight), and more preferably not more than 15% by weight (e.g., about 3 to 15% by weight).

In the composition (or the molded article described later) of the present invention, the proportion of the resin particle (B) in the total amount of the resin particle (B) and the matrix resin (C) (when the matrix resin contains a curing agent and/or a curing accelerator, the amount of the matrix resin (C) means the total amount of the resin and the curing agent and/or the curing accelerator) can be selected from a range of not more than 30% by volume (e.g., about 0.01 to 25% by volume) or may, for example, be not more than 20% by volume (e.g., about 0.1 to 15% by volume), preferably not more than 10% by volume (e.g., about 0.3 to 8% by volume), and more preferably not more than 5% by volume (e.g., about 0.5 to 3% by volume).

According to the present invention, the reinforcing effect by the reinforcing fiber is sufficiently obtainable if the proportion of the resin particle (B) is low.

In the composition (or the molded article described later) of the present invention, the ratio of the total amount of the resin particle (B) and the matrix resin (C) relative to 100 parts by weight of the reinforcing fiber (A) may be, for example, about 1 to 70 parts by weight, preferably about 2 to 50 parts by weight, and more preferably about 3 to 30 parts by weight.

The composition of the present invention may optionally contain any other component that does not damage the effects of the present invention. Such a component can suitably be selected as usage or others. For example, the component may include a stabilizer, a filler (a non-fibrous filler), a coloring agent, a dispersing agent, a preservative, an antioxidant, and a defoaming agent. These components may be used alone or in combination.

The composition of the present invention may contain an electroconductive particle as Patent Document 1 or may usually be free from an electroconductive particle.

(Form of Composition and Production Process)

The form of the composition of the present invention comprises the reinforcing fiber (A), the resin particle (B), and the matrix resin (C) (and optionally other components, the same applies hereinafter). The composition may usually be in the form that the reinforcing fiber (A) is impregnated with a mixture containing the resin particle (B) and the matrix resin (C) (or the matrix resin (C) containing the resin particle (B)) [or in the form that the mixture is attached to the reinforcing fiber (A)]. Such a form can also be expressed as the form that the reinforcing fiber (A) and the resin particle (B) are dispersed in the matrix resin (C).

Such a composition may be a pre-preg (an intermediate material for molding). For example, in a case where the matrix resin (C) is a thermosetting resin component [for example, an epoxy resin component (e.g., containing an epoxy resin and a curing agent)], the composition may be in a semi-cured (or tack free) state.

The form of the composition can be selected according to the shape of the reinforcing fiber (A), or others. Concrete forms may include, for example, (i) a form in which a plurality of the reinforcing fibers (A) arranged in the same direction (or one direction) is impregnated with the mixture and (ii) a form in which a cloth formed with the reinforcing fiber (A) is impregnated with the mixture. A pre-preg composition having the form (i) is known as UD pre-preg or others. A pre-preg composition having the form (ii) is known as Cloth pre-preg or others.

The composition can be produced by mixing the reinforcing fiber (A), the resin particle (B), and the matrix resin (C) as described above. The composition can usually be produced by impregnating the reinforcing fiber (A) with a mixture containing the resin particle (B) and the matrix resin (C) [or by attaching the mixture to the reinforcing fiber (A)].

In a case where the resin particle (B) contains the small resin particle (B1) and the large resin particle (B2), a particle group containing the small resin particle (B1) and a particle group containing the large resin particle (B2) may be mixed.

Concrete impregnation methods may include (a) impregnating the reinforcing fiber (A) with the mixture which is liquid, (b) allowing a sheet composed of the mixture to contact with the reinforcing fiber (A) under an applied pressure, or other methods.

For the method (a), the liquid mixture may be obtained by using the matrix resin (C) which is liquid (liquid at a room temperature) or by adding a suitable solvent (a poor solvent to the resin particle (B)). Alternatively, the liquid mixture can also be obtained by melting the matrix resin (C).

[Molded Article]

The present invention also includes a molded article of the composition (a molded article comprising the composition). The molded article, which contains the reinforcing fiber (A) and the matrix resin (C) in which the reinforcing fiber (A) is dispersed, can be referred to as a composite [a fiber-reinforced composite (in particular, a carbon fiber composite)].

The process for producing (molding) the molded article can be selected according to the form of the composition or the species of the component of the composition, or others.

For example, in a case where the matrix resin (C) is a thermosetting resin component, the molded article can be produced by curing the composition (specifically, the composition having a desired shape). That is, the molded article, in which the matrix resin (C) is a thermosetting resin component, can be referred to as a cured product of the composition. The molding process can also be selected according to the degree of curing of the thermosetting resin component (e.g., non-curing or semi-curing), or others. The molded article may have a one-dimensional form (such as a rod form), a two-dimensional form (such as a sheet form), or a three-dimensional form.

Concrete molding processes may include a hand lay up molding, a SMC (sheet molding compound) press molding, a RIMP (resin infusion molding process), a pre-preg press molding, a pre-preg autoclave, a winding (such as a filament winding or a pin winding), a pultrusion molding, a BMC (bulk molding compound) molding, or other processes.

As described above, the molded article is obtainable. According to the molded article (or composition) of the present invention, the resin particle (B) can increase the reinforcing function of the reinforcing fiber (A) (for example, interlaminar toughness). In particular, according to the present invention, the resin particle (B) having a specific form and a specific particle diameter efficiently improves the reinforcing effect by the reinforcing fiber (A), and a sufficient reinforcing function is achievable at a relatively low proportion of the resin particle (B).

Although the reason is unknown, part of the reason is probably that, according to the molded article (or composition) of the present invention, the resin particle (B) is not uniformly dispersed in the matrix resin (C) but richly (or locally) distributed, particularly, on or near the reinforcing fiber (A) in the matrix resin (C).

In particular, for the composition containing the small resin particle (B1) and the large resin particle (B2), each of the small resin particle (B1) and the large resin particle (B2) is richly distributed on or near the reinforcing fiber (A) in different areas. This probably leads to further improvement of the reinforcing function. Specifically, a typical CFRP containing a carbon fiber and a curable resin such as an epoxy resin is produced by placing a woven fabric composed of a carbon fiber bundle on an uncured curable resin (liquid) to infiltrate the curable resin into the woven fabric, applying an uncured curable resin on the resulting woven fabric, repeating the placing step and the applying step, and heating the resulting product for curing. The resulting CFRP contains alternate cured resin layers and woven fabric layers; each cured resin layer comprises the cured resin, and each woven fabric layer comprises the woven fabric containing the cured resin. It is probable that the large resin particle (B2) is richly distributed on or near a boundary between the cured resin layer and the woven fabric, preventing formation of a crack between the cured resin layer and the woven fabric. Further it is probable that the small resin particle (B1) enters inter-fiber spaces inside the woven fabric, preventing formation of a crack between the fibers in the fabric (specifically, formation of a crack in inter-fiber spaces inside the fiber bundle and then formation of a crack in spaces between intersecting fiber bundles).

EXAMPLES

The following examples are intended to describe this invention in further detail and should by no means be interpreted as defining the scope of the invention. Components used in Examples and methods for each strength test in Examples are as follows.

[Resin Particle]

Aliphatic polyamide particle (A1): Highly spherical polyamide 12 particle having an average particle diameter of 25 µm [The proportion of a particle having a particle diameter of 12 to 70 µm (particularly, 15 to 60 µm) was not less than 90%. The value was measured by laser diffraction scattering method in accordance with JIS R9301-2-2 using "LA-920" manufactured by Horiba, Ltd., the same applies hereinafter]. The particle was produced by melt-kneading a polyamide 12 ("VESTAMID L1500" manufactured by Daicel-Evonik Ltd., melting point: 178° C.) and a heat-melting saccharide as an incompatible material for forced emulsification and liquating out the saccharide.

Aliphatic polyamide particle (A2): "VESTOSINT 2070" manufactured by Daicel-Evonik Ltd., potato-shaped polyamide 12 particle (chemical pulverization product), average particle diameter: 8 µm Aliphatic polyamide particle (A3): Highly spherical polyamide 12 particle having an average particle diameter of 19 µm. The particle was produced by melt-kneading a polyamide 12 ("DAIAMID L1600" manufactured by Daicel-Evonik Ltd.) and sorbitol as an incompatible material for forced emulsification and liquating out sorbitol. Particle size distribution: particle with 1 to 5 µm of 3.5% by weight, particle with 10 to 30 µm of 88.1% by weight, particle with 70 µm or more of less than 1% by weight Aliphatic polyamide particle (A4): Highly spherical polyamide 12 particle having an average particle diameter of 52 µm. The particle was produced by melt-kneading a polyamide 12 ("DAIAMID L1901" manufactured by Daicel-Evonik Ltd.) and sorbitol as an incompatible material for forced emulsification and liquating out sorbitol. Particle size distribution: particle with 1 to 5 µm of 1.3% by weight, particle with 10 to 30 µm of 11.3% by weight, particle with 70 µm or more of 39.8% by weight Alicyclic polyamide particle (B1): Highly spherical alicyclic polyamide particle having an average particle diameter of 23 µm [The proportion of a particle having a particle diameter of 12 to 70 µm (particularly 15 to 60 µm) was not less than 90%.] The particle was produced by melt-kneading an alicyclic polyamide ("TROGAMID CX7323" manufactured by Daicel-Evonik Ltd., melting point: 247° C.) and a poly(ethylene glycol) as an incompatible material for forced emulsification and liquating out the poly(ethylene glycol). Particle size distribution: particle with 1 to 5 µm of 3.1% by weight, particle with 10 to 30 µm of 85.3% by weight, particle with 70 µm or more of less than 1% by weight Alicyclic polyamide particle (B2): Highly spherical alicyclic polyamide particle having an average particle diameter of 36 µm [The proportion of a particle having a particle diameter of 12 to 70 µm (particularly, 15 to 60 µm) was not less than 90%.] The particle was produced by melt-kneading an alicyclic polyamide ("TROGAMID CX7323" manufactured by Daicel-Evonik Ltd., melting point: 247° C.) and a poly(ethylene glycol) as an incompatible material for forced emulsification and liquating out the poly(ethylene glycol).

Alicyclic polyamide particle (B3): Amorphous alicyclic polyamide particle having an average particle diameter of 34 µm. The particle was produced by cryogenically pulverizing an alicyclic polyamide ("TROGAMID CX7323" manufactured by Daicel-Evonik Ltd., melting point: 247° C.)

Alicyclic polyamide particle (B4): Highly spherical alicyclic polyamide particle having an average particle diameter of 11 µm. The particle was produced by subjecting an alicyclic polyamide ("TROGAMID CX7323" manufactured by Daicel-Evonik Ltd., melting point: 247° C.) and a poly (ethylene glycol) as an incompatible material to forced emulsification.

Alicyclic polyamide particle (B5): Highly spherical alicyclic polyamide particle having an average particle diameter of 89 μm. The particle was produced by melt-kneading an alicyclic polyamide ("TROGAMID CX7323" manufactured by Daicel-Evonik Ltd., melting point: 247° C.) and a poly(ethylene glycol) as an incompatible material for forced emulsification and liquating out the poly(ethylene glycol).

Alicyclic polyamide particle (B6): Highly spherical alicyclic polyamide particle having an average particle diameter of 5.1 μm. The particle was produced by melt-kneading an alicyclic polyamide ("TROGAMID CX7323" manufactured by Daicel-Evonik Ltd., melting point of 247° C.) and a poly(ethylene glycol) as an incompatible material for forced emulsification and liquating out the poly(ethylene glycol). Particle size distribution: particle with 1 to 5 μm of 49.5% by weight, particle with 10 to 30 μm of 2.5% by weight, particle with 70 μm or more of less than 1% by weight Aromatic polyamide particle (C1): Highly spherical aromatic polyamide particle having an average particle diameter of 28 μm [The proportion of a particle having a particle diameter of 12 to 70 μm (particularly, 15 to 60 μm) was not less than 90%]. The particle was produced by melt-kneading an aromatic polyamide ("TROGAMID T5000" manufactured by Daicel-Evonik Ltd., amorphous, non-melting at 175° C.) and a poly(ethylene glycol) as an incompatible material for forced emulsification and liquating out the poly(ethylene glycol).

Aromatic polyamide particle (C2): Amorphous aromatic polyamide particle having an average particle diameter of 31 μm. The particle was produced by cryogenically pulverizing an aromatic polyamide ("TROGAMID T5000" manufactured by Daicel-Evonik Ltd., amorphous, non-melting at 175° C.)

[Interlaminar Shear Strength]

In order to introduce a precrack, a polyimide film having a thickness of 25 μm ("KAPTON" manufactured by DU PONT-TORAY CO., LTD.) was interposed between the 6th and 7th woven fabrics in the laminate as described later, and the resulting laminate [a 13-layer laminate having 12 woven fabrics and one polyimide film interposed between the 6th and 7th woven fabrics] was cured. The cured laminate was cut to give a test piece 140 mm long and 25 mm wide so that the warp direction might agree with a longitudinal direction of the test piece.

The interlaminar shear strength of this test piece was measured. For the measurement, a three-point bending tester (Tensilon universal testing machine "RTC-1350A") was used [three points (20 mm, 70 mm, 120 mm) in long direction], and the test speed was 0.5 mm/minute.

[Flexural Strength]

The cured laminate was cut to give a test piece 80 mm long and 15 mm wide so that the warp direction might agree with a longitudinal direction of the test piece. The test piece was tested for three-point bending test [three points (20 mm, 40 mm, 60 mm) in long direction] using a three-point bending tester (Tensilon universal testing machine "RTC-1350A") to determine a flexural strength. For the measurement, the span distance was 60 mm, and the test speed was 1 mm/minute.

Examples 1 to 4 and Comparative Examples 1 to 5

A resin particle was added to a matrix resin [a composition containing an epoxy resin ("jER828" manufactured by Mitsubishi Chemical Corporation) and an amine-based curing agent ("jERCURE W" manufactured by Mitsubishi Chemical Corporation)] at a proportion (3% by weight, 5% by weight, 7% by weight, or 9% by weight) as shown in Table 1, and the resulting mixture was stirred using a hot stirrer for 24 hours under conditions of 100° C. and 600 rpm. Then, the mixture was allowed to stand in a vacuum vessel for one hour for defoaming to give a matrix resin containing a resin particle.

Woven fabrics (plain weaves) of a carbon fiber (TC-33, HONLU TECHNOLOGY CO. LTD, average fiber diameter: about 7 μm) were impregnated with the resulting matrix resin containing the resin particle to give a laminate by hand lay up method.

Two type of laminates were produced with respect to each proportion of the resin particle. Specifically, one type was a 12-layer laminate having 12 woven fabrics, and the other was a 13-layer laminate having 12 woven fabrics and one polyimide film.

Each laminate was put in a thermostatic bath in a state that a pressure of about 8 MPa was loaded, and was allowed to stand at 100° C. for 2 hours and then at 175° C. for 4 hours for curing treatment. The resulting cured product had a thickness of about 2.8 μm.

The resulting cured product (cured laminate) was examined for the interlaminar shear strength and the flexural strength.

For the resulting cured product, the location (the dispersion pattern) of the resin particle present in the matrix resin was observed. The location was examined by embedding the test piece used for flexural strength measurement in an epoxy resin, grinding a section of the embedded product, and observing the ground surface with a light microscope. If the resin particle was richly distributed on or near the interface between the matrix resin and the fiber in the laminate (the interface between the epoxy resin layer and the surface of the woven fabric), the dispersion pattern was evaluated as "On or near interface"; if the resin particle was uniformly dispersed in the matrix resin without localized distribution, the dispersion pattern was evaluated as "uniform".

The results are shown in Table 1. For comparison, Table 1 also shows the results of cured products produced in the same manner as the above except that the resin particle was not added (or the proportion of the resin particle was 0% by weight).

TABLE 1

|  |  | Example 1 | Comparative Example 1 | Example 2 | Example 3 | Comparative Example 2 | Comparative Example 3 | Comparative Example 4 | Example 4 | Comparative Example 5 |
|---|---|---|---|---|---|---|---|---|---|---|
| Resin particle | Type | A1 | A2 | B1 | B2 | B3 | B4 | B5 | C1 | C2 |
|  | Type of polyamide | Aliphatic | Aliphatic | Alicyclic | Alicyclic | Alicyclic | Alicyclic | Alicyclic | Aromatic | Aromatic |
|  | Shape | Highly spherical | Potato-shaped | Highly spherical | Highly spherical | Amorphous | Highly spherical | Highly spherical | Highly spherical | Amorphous |
|  | Average particle diameter (μm) | 25 | 8 | 23 | 36 | 34 | 11 | 89 | 28 | 31 |

TABLE 1-continued

|  |  | Example 1 | Comparative Example 1 | Example 2 | Example 3 | Comparative Example 2 | Comparative Example 3 | Comparative Example 4 | Example 4 | Comparative Example 5 |
|---|---|---|---|---|---|---|---|---|---|---|
| Interlaminar shear strength (kJ/m$^2$) | 0% by weight | 3.0 | 3.0 | 3.0 | 3.0 | 3.0 | 3.0 | 3.0 | 3.0 | 3.0 |
|  | 3% by weight | 5.5 | 2.9 | 5.7 | 5.6 | 3.0 | 3.0 | 3.1 | 5.8 | 3.0 |
|  | 5% by weight | 5.0 | 2.9 | 5.5 | 5.5 | 2.7 | 3.1 | 3.5 | 5.8 | 3.7 |
|  | 7% by weight | 5.0 | 2.9 | 5.0 | 5.1 | 2.7 | 3.7 | 4.1 | 5.5 | 4.7 |
|  | 9% by weight | 4.5 | 2.9 | 4.5 | 4.4 | 3.3 | 3.1 | 2.8 | 4.9 | 4.4 |
| Flexural strength (MPa) | 0% by weight | 720 | 720 | 720 | 720 | 720 | 720 | 720 | 720 | 720 |
|  | 3% by weight | 765 | 720 | 785 | 780 | 720 | 720 | 720 | 787 | 720 |
|  | 5% by weight | 780 | 747 | 785 | 777 | 735 | 740 | 740 | 780 | 720 |
|  | 7% by weight | 760 | 757 | 766 | 765 | 749 | 761 | 759 | 768 | 751 |
|  | 9% by weight | 757 | 748 | 760 | 757 | 730 | 750 | 700 | 760 | 733 |
| Dispersion pattern of resin particle |  | On or near interface | Uniform | On or near interface | On or near interface | Uniform | On or near interface | Uniform | On or near interface | Uniform |

As apparent from the results shown in Table 1, for Examples, the interlaminar shear strength (delamination strength) and the flexural strength were large when the weight ratio of the resin particle was 3% by weight; in contrast, for Comparative Examples, these strengths tended to be the maximum when the weight ratio of the resin particle was 7% by weight. Specifically, it was found that Comparative Examples required a larger amount of the resin particle compared with Examples in order to obtain a sufficient strength. In addition, for Examples, larger maximum strengths (in particular, interlaminar shear strength) were surprisingly achieved at a smaller amount of the resin particle compared with Comparative Examples.

In particular, from the results of Example 1 and Comparative Example 1 or the results of Example 2 or 3 and Comparative Examples 3 and 4, the resin particle with an average particle diameter beyond the range in the present invention had smaller strengths (in particular, interlaminar shear strength), including smaller maximum strengths, in a case where the resin particle was in not only a potato shape or amorphous shape but also in a highly spherical shape.

From the results of Example 2 or 3 and Comparative Example 2 or from the results of Example 4 and Comparative Example 5, the resin particle having an amorphous shape also had smaller strengths (in particular, interlaminar shear strength), including smaller maximum strengths, even in a case where the resin particle had the same average particle diameter as that in Examples.

Examples 5 to 9, Reference Example 1 and Comparative Examples 6 to 7

A resin particle was added to a matrix resin [a composition containing an epoxy resin ("jER828") and an amine-based curing agent ("jERCURE W")] at a composition (3% by weight, 5% by weight, 10% by weight, 15% by weight, or 20% by weight) as shown in Table 2, and the resulting mixture was stirred using a hot stirrer for 24 hours under conditions of 100° C. and 600 rpm. Then, the mixture was allowed to stand in a vacuum vessel for one hour for defoaming to give a matrix resin containing a resin particle.

Woven fabrics (plain weaves) of a carbon fiber (TC-33) were impregnated with the resulting matrix resin containing the resin particle to give a laminate having 12 woven fabrics by hand lay up method.

Each laminate was put in a thermostatic bath in a state that a pressure of about 8 MPa was loaded, and was allowed to stand at 100° C. for 2 hours and then at 175° C. for 4 hours for curing treatment. The resulting cured product had a thickness of about 2.8 μm.

The resulting cured product (cured laminate) was examined for the flexural strength.

The results are shown in Table 2. For comparison, Table 2 also shows the results of cured products produced in the same manner as the above except that the resin particle was not added.

TABLE 2

|  |  | Example 5 | Example 6 | Example 7 | Example 8 | Example 9 | Comparative Example 6 | Reference Example 1 | Comparative Example 7 |
|---|---|---|---|---|---|---|---|---|---|
| Resin particle (% by weight) | Alicyclic polyamide B1 | 70 | 100 | 90 | 50 | — | — | — | 20 |
|  | Alicyclic polyamide B6 | 30 | — | 10 | 50 | 50 | 100 | — | 80 |
|  | Aliphatic polyamide A3 | — | — | — | — | 50 | — | — | — |
|  | Aliphatic polyamide A4 | — | — | — | — | — | — | 100 | — |
| Particle size distribution of mixed particle (% by weight) | 1 to 5 μm | 17 | 3 | 8 | 26 | 27 | 50 | 1 | 40 |
|  | 10 to 30 μm | 60 | 85 | 77 | 44 | 45 | 3 | 12 | 19 |
|  | over 70 μm | <1 | <1 | <1 | <1 | <1 | <1 | 40 | <1 |
| Flexural strength (MPa) | 0% by weight | 720 | 720 | 720 | 720 | 720 | 720 | 720 | 720 |
|  | 3% by weight | 765 | 765 | 765 | 744 | 732 | 720 | 717 | 720 |
|  | 5% by weight | 785 | 780 | 778 | 769 | 741 | 733 | 713 | 740 |
|  | 10% by weight | 792 | 757 | 781 | 778 | 755 | 738 | 723 | 720 |
|  | 15% by weight | 794 | 743 | 786 | 792 | 768 | 709 | 700 | 717 |
|  | 20% by weight | 778 | 740 | 779 | 783 | 761 | 701 | 701 | 693 |

As apparent from the results shown in Table 2, in Examples, the flexural strength was large. In particular, for Examples 5 and 7 to 9, in which the small resin particle and the large resin particle were used in combination, the flexural strength was increased at a weight ratio of the resin particle of up to 15% by weight. In contrast, for Example 6, in which the large resin particle was used alone, the flexural strength was decreased when the weight ratio of the resin particle exceeded 5% by weight.

INDUSTRIAL APPLICABILITY

The composition of the present invention is usable as a composition for a fiber-reinforced composite. Such a composite is applicable for structural members (structural materials) in various fields, for example, vehicles (for example, aircraft, helicopters, rockets, automobiles, motorcycles, bicycles, trains, ships, and wheelchairs), artificial satellites, windmills, sports products (shafts of golf clubs, tennis rackets), chassis (such as chassis of laptops), molded articles in medical fields (such as artificial bones), IC trays, fishing rods, and bridge piers.

The invention claimed is:

1. A molded article comprising a composition comprising:
   (A) a reinforcing fiber,
   (B) a resin particle, and
   (C) a matrix resin,
   wherein the reinforcing fiber (A) comprises a carbon fiber, and
   the resin particle (B) comprises a spherical resin particle having an average particle diameter of 12 to 70 μm,
   the resin particle (B) comprises (B1) a small resin particle and (B2) a large resin particle, (B1) the spherical small resin particle having a particle diameter less than an average fiber diameter of the reinforcing fiber (A) and (B2) the spherical large resin particle having a particle diameter not less than the average fiber diameter of the reinforcing fiber (A),
   a weight ratio of the small resin particle (B1a) relative to the large resin particle (B2a) is 5/95 to 50/50 in the former/the latter,
   the reinforcing fiber (A) is in a form of a fiber assembly, the small resin particle (B1) is richly distributed between fibers inside the fiber assembly, and
   the large resin particle (B2) is richly distributed on or near a boundary between a surface of the fiber assembly and a matrix resin.

2. The molded article according to claim 1, wherein the average particle diameter of the resin particle (B) is 15 to 60 μm.

3. The molded article according to claim 1, wherein the average particle diameter of the resin particle (B) is 1 to 10 times as large as an average fiber diameter of the reinforcing fiber (A).

4. A composition comprising:
   (A) a reinforcing fiber,
   (B) a resin particle, and
   (C) a matrix resin,
   wherein the reinforcing fiber (A) comprises a carbon fiber, and
   the resin particle (B) comprises:
   (B1) a spherical small resin particle having a particle diameter less than an average fiber diameter of the reinforcing fiber (A) and
   (B2) a spherical large resin particle having a particle diameter not less than the average fiber diameter of the reinforcing fiber (A),
   a weight ratio of the small resin particle (B1a) relative to the large resin particle (B2a) is 5/95 to 50/50 in the former/the latter, and
   the proportion of the resin particle (B) is 1 to 18% by weight in the total amount of the resin particle (B) and the matrix resin (C).

5. The composition according to claim 4, wherein the small resin particle (B1) comprises (B1a) a small resin particle having a particle size distribution of 1 to 5 μm, and
   the large resin particle (B2) comprises (B2a) a large resin particle having a particle size distribution of 10 to 30 μm.

6. The composition according to claim 4, wherein a total amount of the small resin particle (B1a) and the large resin particle (B2a) is not less than 50% by weight in the resin particle (B), and
   a proportion of a resin particle having a particle diameter over 70 μm is not more than 20% by weight in the resin particle (B).

7. The molded article according to claim 1, wherein the resin particle (B) comprises a polyamide resin particle.

8. The molded article according to claim 1, wherein the resin particle (B) comprises an alicyclic polyamide resin particle.

9. The molded article according to claim 1, wherein a proportion of the resin particle (B) is not more than 15% by weight in a total amount of the resin particle (B) and the matrix resin (C).

10. The molded article according to claim 1, wherein the matrix resin (C) comprises a thermosetting resin.

11. The molded article according to claim 1, wherein the resin particle (B) comprises a highly spherical polyamide resin particle having an average particle diameter of 20 to 40 μm,
    the average particle diameter of the resin particle (B) is 2 to 6 times as large as an average fiber diameter of reinforcing fiber (A),
    a proportion of the resin particle (B) is 1 to 5% by weight in a total amount of the resin particle (B) and the matrix resin (C), and
    the matrix resin (C) comprises an epoxy resin.

12. The composition according to claim 4, wherein the small resin particle (B1) comprises a highly spherical polyamide resin particle having an average particle diameter of 1 to 5 μm,
    the large resin particle (B2) comprises a highly spherical polyamide resin particle of an average particle diameter of 10 to 30 μm,
    the large resin particle (B2) has an average particle diameter of 2 to 6 times as large as the average fiber diameter of the reinforcing fiber (A),
    the resin particle (B) has a proportion of 3 to 15% by weight in a total amount of the resin particle (B) and the matrix resin (C), and
    the matrix resin (C) comprises an epoxy resin.

13. A process for producing a molded article recited in claim 1, the process comprising impregnating (A) a reinforcing fiber with a mixture comprising (B) a resin particle and (C) a matrix resin.

14. The composition according to claim 4, wherein the resin particle (B) comprises a polyamide resin particle.

15. The composition according to claim 4, wherein the resin particle (B) comprises an alicyclic polyamide resin particle.

16. The composition according to claim 4, wherein a proportion of the resin particle (B) is not more than 15% by weight in a total amount of the resin particle (B) and the matrix resin (C).

17. The composition according to claim 4, wherein the matrix resin (C) comprises a thermosetting resin.

18. A process for producing a composition recited in claim 4, the process comprising impregnating (A) a reinforcing fiber with a mixture comprising (B) a resin particle and (C) a matrix resin.

* * * * *